United States Patent
Qin

(10) Patent No.: US 8,278,844 B2
(45) Date of Patent: Oct. 2, 2012

(54) ENERGY-SAVING LAMP WITH REMOTE CONTROL AND BUTTON DIMMING FEATURE

(75) Inventor: Bing Qin, Zhejiang (CN)

(73) Assignee: Ningbo Huadian Envirotech Co., Ltd., Jiangbei Zone, Ningbo, Zhejiang (CN)

(*) Notice: Subject to any disclaimer, the term of this patent is extended or adjusted under 35 U.S.C. 154(b) by 411 days.

(21) Appl. No.: 12/729,196

(22) Filed: Mar. 22, 2010

(65) Prior Publication Data
US 2011/0089847 A1    Apr. 21, 2011

(30) Foreign Application Priority Data
Oct. 20, 2009   (CN) .......................... 2009 2 0269613

(51) Int. Cl.
*H05B 37/02* (2006.01)
(52) U.S. Cl. .... 315/307; 315/291; 315/159; 315/DIG. 4
(58) Field of Classification Search .................. 315/291, 315/294–297, 307, 308, 247, 246, 224, 244, 315/209 R, 159, DIG. 4
See application file for complete search history.

(56) References Cited

U.S. PATENT DOCUMENTS

| | | | | |
|---|---|---|---|---|
| 7,009,348 B2 * | 3/2006 | Mogilner et al. | ............. | 315/307 |
| 7,812,549 B2 * | 10/2010 | Yuen | ............... | 315/291 |
| 8,212,483 B2 * | 7/2012 | Reisch | ............. | 315/82 |
| 2012/0091902 A1 * | 4/2012 | Radermacher | ............... | 315/159 |

FOREIGN PATENT DOCUMENTS
CN         101309545 A    * 11/2008
* cited by examiner

*Primary Examiner* — Haiss Philogene
(74) *Attorney, Agent, or Firm* — Global IP Services; Tianhua Gu

(57) ABSTRACT

This invention relates to a kind of dimmable energy-saving lamp with remote control and buttons dimming feature comprising: a power supply module (1), one end of which being connected to municipal power supply via the button-dimming switch (K), another end of which being connected to different parts of the whole circuit including the SCM control module (2), an SCM control module (2), the output end of which being connected to the dimming control module (3), the signal output end of said dimming control module (3) being connected to the signal input end of the energy-saving lamp tube as well as the energy-saving lamp tube as the illuminating component; the invention further features: a remote-control transmitting module (5) for transmitting wireless signals at least including dimming signals; a remote-control receiving module (6) for receiving wireless signals at least including dimming signals, the output end of said remote-control receiving module (6) being connected to an input end of said SCM control module (2); adopting remote control and button operation, this invention can achieve smooth dimming of energy-saving lamp tube within a large scope, making it a remote control energy-saving lamp capable of stepless dimming.

6 Claims, 11 Drawing Sheets

ENERGY-SAVING LAMP WITH REMOTE CONTROL AND BUTTON DIMMING FEATURE

CROSS REFERENCE TO RELATED PATENT APPLICATION

This application claims the priority of the Chinese patent application No. 200920269613.X filed on Oct. 20, 2009, which application is incorporated herein by reference.

FIELD OF THE INVENTION

This utility relates to a kind of dimmable energy-saving lamp.

BACKGROUND OF THE INVENTION

The Chinese Invention Patent under Publication Number CN101309545 (Application number CN200810063600.7) disclosed A Kind of Dimmable Energy-saving Lamp with One-button Control, which comprises the lamp head, the lamp chamber and the energy-saving lamp tube, said lamp chamber being provided with a electronic ballast inside, said electronic ballast being provided with the regulating and filtering circuit, the voltage-control oscillation half-bridge circuit and the serial resonance circuit, the input end of said regulating and filtering circuit being connected to external power supply via said lamp head, the output end of said regulating and filtering circuit being connected to the input end of said voltage-control oscillation half-bridge circuit, the output end of said voltage-control oscillation half-bridge circuit being connected to the energy-saving lamp tube of said serial resonance circuit, said patent is featured by a SCM processing circuit inside said electronic ballast, the input end of said SCM processing circuit is connected to a working status detection circuit, the output end of said SCM processing circuit is connected to said voltage-control oscillation half-bridge circuit via the signal conversion circuit; said working status detection circuit outputs sampling signals, which will then be received and processed by said SCM processing circuit, which at the same time outputs the pulse width modulation signals, said signal conversion circuit converts said pulse width modulation signals into smooth dimming voltage signals, which will then be inputted in said voltage-control oscillation half-bridge circuit for dimming; said SCM processing circuit is provided with a control program, which allows the dimmable energy-saving lamp to work respectively in the brightest working status, continuous changing status and locked brightness status.

However, the button-controlled energy-saving lamp above has complicated circuit structure and high cost. Furthermore, it can be known from the circuits disclosed in the patent above that the patent only adopts button control, without remote control, the operation is not convenient; besides, the working status detection circuit comprises the $2^{nd}$ resistor R2, the $1^{st}$ capacitor C1, the $1^{st}$ resistor R1, the $1^{st}$ diode D1, the 2nd capacitor C2, the power on and power down of buttons are tested with the voltage at the $2^{nd}$ resistor R2, since the charging and discharging of the $1^{st}$ capacitor C1 and the $2^{nd}$ capacitor C2 is a process of infinitesimal calculus, which is influenced by the $4^{th}$ capacitor C4 on ICVCC, the time of charging and discharging cannot correspond to the hand-pressing time in real time, thus there is great time delay, which will necessarily result in dimming failure when the switch is turned on or off rapidly by hand. Finally, the working power supply of SCM is not reliable, which may cause incapability of the whole circuit, the detail is as follows: the SCM provides the PWM signal and process it into average voltage, which is sent to the voltage-control oscillator, which drives the operation of the serial resonance circuit for turning on or dim the energy-saving lamp tube, it is shown in the actual electrical diagram of the patent above, the working voltage ICVCC of the SCM is the DC voltage from the coupling of inductors L2 and L1, while L2 can only generate working current when the lamp tube is lit after the operation of the voltage-control oscillator and the serial resonance circuit. When the product is just powered on, the voltage-control oscillator is not working (waiting for PWM signal), and thus the serial resonance circuit cannot work, so there's no working current on L2, thus L1 cannot be coupled to generate the ICVCC voltage, without working voltage, the SCM cannot output PWM signals, thus the circuit can never work with no ICVCC voltage generated.

SUMMARY OF THE INVENTION

The primary purpose of this invention is to provide a kind of energy-saving lamp, and more specially, a kind of energy-saving lamp with remote control and button control features capable of smooth dimming for lamp tube within a broad scope and capable of realizing stepless dimming, so as to solve the problem of existing technologies mentioned above.

Another technical problem to be solved by this invention is to provide a kind of energy-saving lamp with remote control and normal button dimming feature that is also provided with luminance memory feature according to existing technologies mentioned above so as to lighten the lamp at the luminance when the lamp is turned off for the last time.

The solution of this invention to solve the technical problems above is: a kind of energy-saving lamp with remote control and button dimming feature comprising:

One power supply module, one end of which is connected with the external power supply through the button-dimming switch, another end of which is connected to different parts of the whole circuit including the SCM control module, said power supply module supplies power to the energy-saving lamp tube and the whole circuit;

One SCM control module, the output end of which is connected to the dimming control module, said SCM control module may output PMW signals of different widths through the application according to the on/off conditions and time of power signals from the power supply module, and the signal output end of said SCM control module is connected to the signal input end of said dimming control module;

One dimming control module, which can output different working voltages according to the received PMW signals of different widths, the signal output end of said dimming control module is connected to the signal input end of the energy-saving lamp tube;

And the energy-saving lamp tube as the illuminating component; said energy-saving lamp further features:

One remote-control transmitting module for encoding directions like increasing and decreasing the luminance, turning on or off the lamp, etc. before transmitting them as wireless RF signals;

One remote-control receiving module for receiving wireless signals of dimming, the output end of which is connected to one input end of said SCM control module, thus the receiving module can decode and compare received RF signals before transmitting them to the SCM.

As an improvement, said whole circuit further comprises: One EEPROM storage module comprises the EEPROM chip, which is connected to the input and output ends of said SCM control module as the luminance memory module, said SCM control module will then store the adjusted luminance in the EEPROM, when startup, the SCM in the SCM control module will invoke the stored value in the EEPROM to lighten the lamp via the circuit. Thus, the SCM outputs PWM signals of different widths or high/low level signals according to the value in the EEPROM, or the value sent by the remote-control receiving module or the SCM reset signals caused by the on/off of buttons, the signal output end of said SCM control module is connected to the signal input end of said dimming control module.

As an optimal practice, said SCM control module comprises:

One SCM microprocessor of model HT48R06,

Wherein, pin 6 of said SCM microprocessor is connected to the signal output end of said remote-control receiving module as the signal input end of said SCM control module;

Pin 17 and Pin 18 of said SCM microprocessor act as the signal communication ends between said SCM control module and said EEPROM storage module;

Pin 1 and Pin 2 of said SCM microprocessor are connected to the signal input end of said dimming control module as the signal output ends of said SCM control module.

As a further improvement, said SCM control module further comprises:

One power circuit, the power module comprises the $1^{st}$ capacitor, the $2^{nd}$ capacitor, the $3^{rd}$ capacitor, the $4^{th}$ capacitor, the $5^{th}$ capacitor, the $6^{th}$ capacitor, the $3^{rd}$ resistor, the $1^{st}$ and $2^{nd}$ diodes and the 3-terminal stabilizing tube.

Wherein, the $1^{st}$ terminal of the $1^{st}$ capacitor is connected to the $2^{nd}$ terminal of said button-dimming switch, the $2^{nd}$ terminal of the $1^{st}$ capacitor is connected to the positive pole of the $1^{st}$ diode, the $2^{nd}$ terminal of the $1^{st}$ capacitor is connected to the negative pole of the $2^{nd}$ diode, both terminals of the $2^{nd}$ capacitor are respectively connected to the negative pole of the $1^{st}$ diode and the positive pole of the $2^{nd}$ diode, the positive pole of the $2^{nd}$ diode is grounded, the negative pole of the $2^{nd}$ diode is connected to the $1^{st}$ terminal of the $3^{rd}$ resistor, the $2^{nd}$ terminal of the $3^{rd}$ resistor is connected to the input end of the 3-terminal stabilizing tube, the output end of said 3-terminal stabilizing tube is connected to Pin 12 of the SCM microprocessor to supply power to the SCM microprocessor; the ground terminal of the 3-terminal stabilizing tube is grounded; the $1^{st}$ terminals of the $3^{rd}$ and the $4^{th}$ capacitors are both connected to the $2^{nd}$ terminal of the $3^{rd}$ resistor, the $2^{nd}$ terminals of the $3^{rd}$ and the $4^{th}$ capacitors are both grounded; the $1^{st}$ terminals of the $5^{th}$ and the $6^{th}$ capacitors are both connected to output end of the 3-terminal stabilizing tube, the $2^{nd}$ terminals of the $5^{th}$ and the $6^{th}$ capacitors are both grounded, so as to obtain stable and reliable power supply module for the SCM control module.

Said dimming control module comprises:

One charging and discharging circuit connected to the signal output end of said SCM control module for converting PWM signals with different widths generated by the SCM control module into continuous voltage signals;

One main control circuit, whose $1^{st}$ signal input pin is connected to the output end of the charging and discharging circuit for voltage-control oscillation processing of voltage signals inputted by the $1^{st}$ signal input pin and outputting square-wave signals of different frequencies at the $1^{st}$ signal output end and the $2^{nd}$ signal output end of said main control circuit;

And the inverter circuit, which is connected to the $1^{st}$ signal output end and the $2^{nd}$ signal output end of said main control circuit and outputs different working voltages to said energy-saving lamp tube according to the square-wave signals of different frequencies outputted by the main control circuit so as to achieve dimming and current stabilization.

In order to increase the variable gain of the current, the SNR of feedback signals of the whole dimming circuit is improved for deep control of dimming and to make the dimming process more linear and maintain stable current at any luminance without extinguishing upon fluctuation of the supply voltage or at the min luminance, said dimming circuit further comprises a closed-loop negative feedback circuit, the signal input end of which is connected to the signal output end of said inverter circuit, the signal output end of said closed-loop negative feedback circuit is connected to the signal input end of said main control circuit.

As an optimal practice, said dimming control module comprises:

One current sampling circuit and one voltage sampling circuit, which form the closed-loop negative feedback circuit;

Wherein, the signal input end of said current sampling circuit is connected to the $1^{st}$ output end of said inverter circuit, the signal output end of said current sampling circuit is connected to the $3^{rd}$ signal input end of said main control circuit;

The signal input end of said voltage sampling circuit is connected with the $2^{nd}$ output end of said inverter circuit, the signal output end of said voltage sampling circuit is connected to the $4^{th}$ signal input end of said main control circuit. Thus, the current and voltage signals obtained from sampling are multiplied in the multiplier inside the main control circuit, and then the average power of the lamp tube is obtained, which is sent to the signal input end of said inverter circuit as the negative feedback signal to realize closed-loop negative feedback control.

Compared with existing technologies, this invention is advantageous in that: through the power supply circuit, SCM control module and dimming control module with simple structure, the smooth dimming of the energy-saving lamp tube within broad scope is achieved, moreover, stepless dimming, remote controlled stepless dimming and remote on and off function of ordinary buttons are also realized; furthermore, adopting software detection of button-dimming switches, this invention is provided with lower cost and more stable performance; finally, this invention is more convenient and practical with the luminance memory feature.

DETAIL DESCRIPTION OF THE INVENTION

Detailed description of this invention will be given in combination with the drawings.

Figure 1:
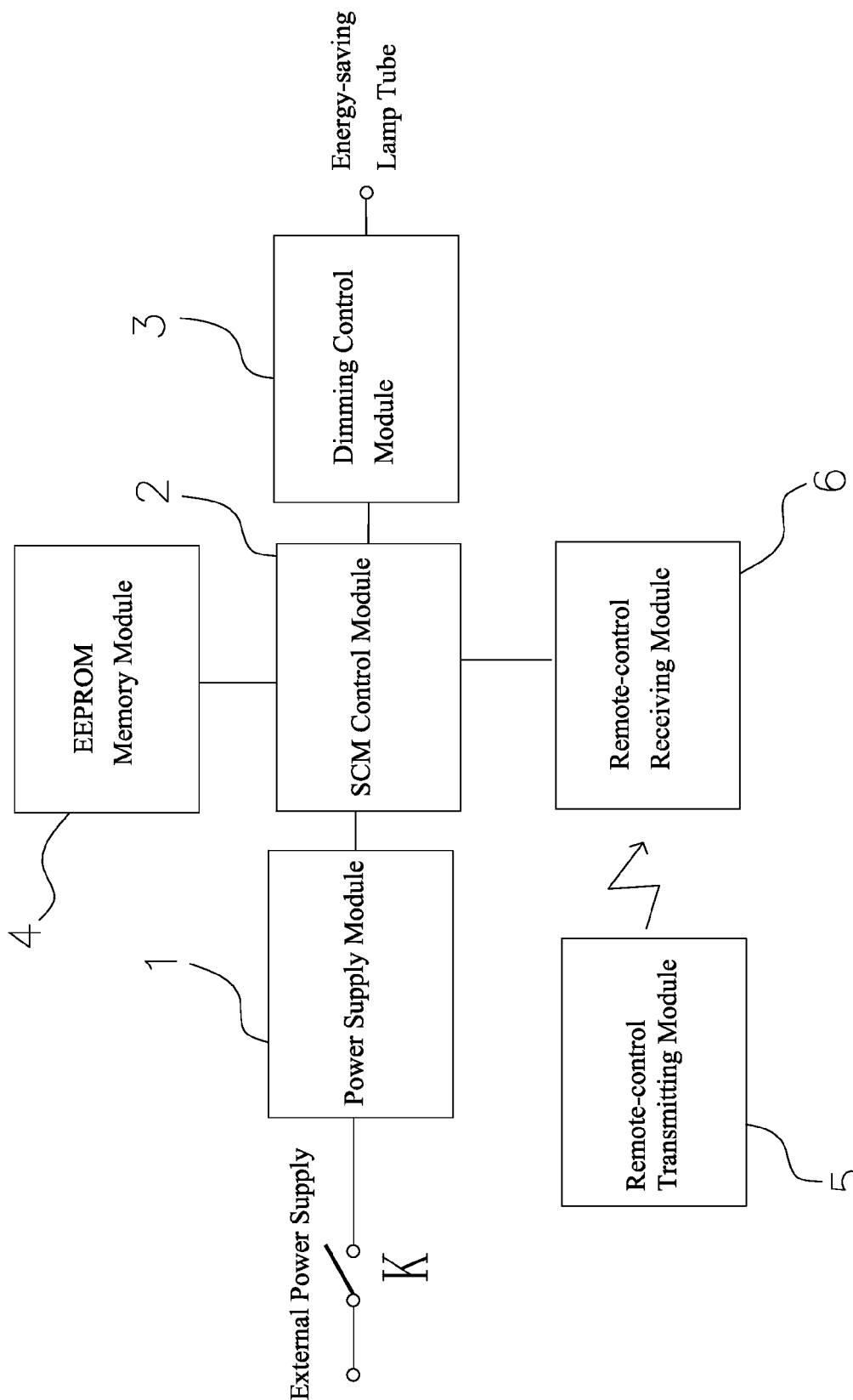
FIG. 1 is a modular diagram for the embodiment of this invention.
Figure 2:
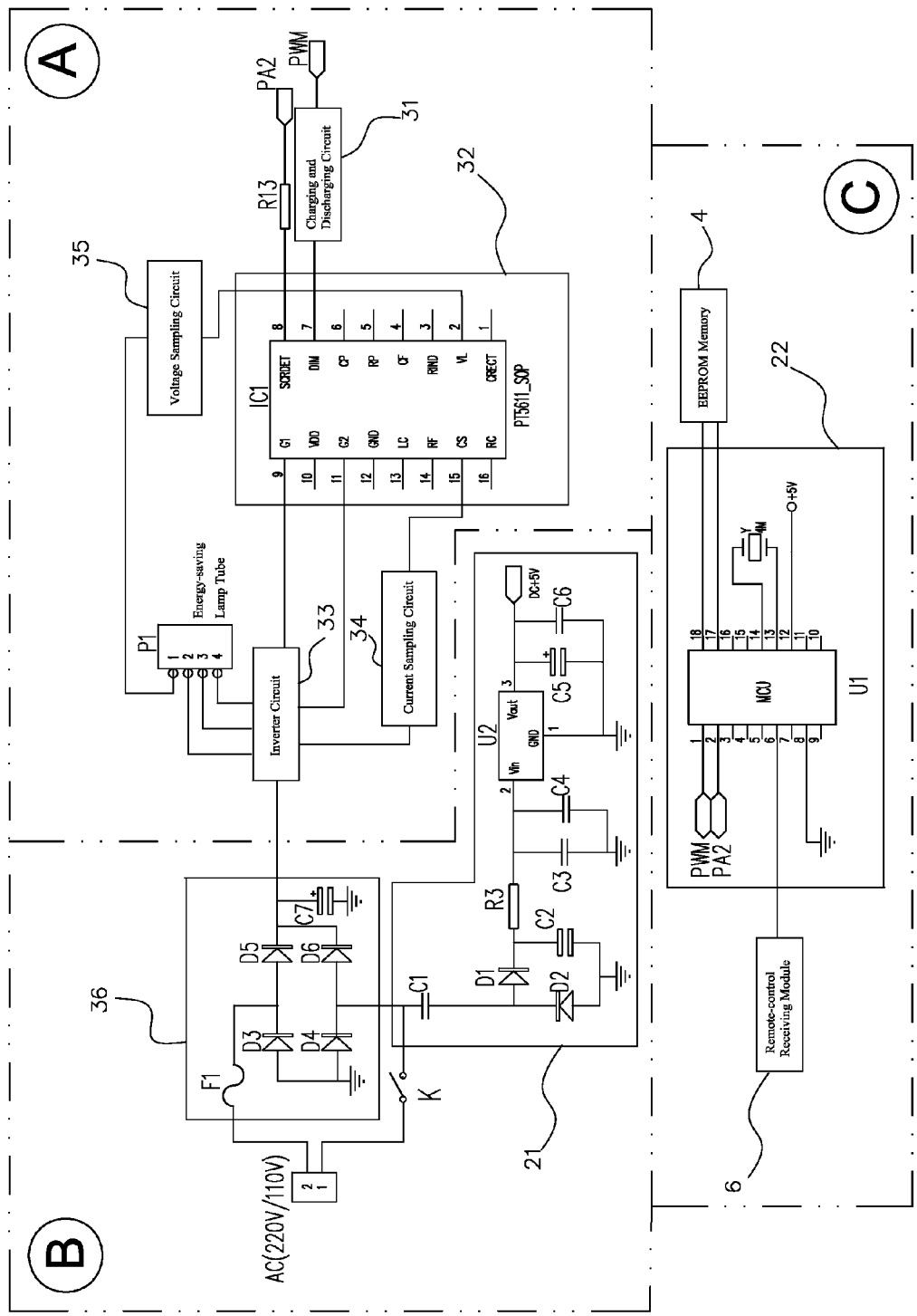
FIG. 2 is a circuit diagram for the embodiment of this invention, the FIG. 2 is separated as three parts of A, B and C.
Figure 2A:
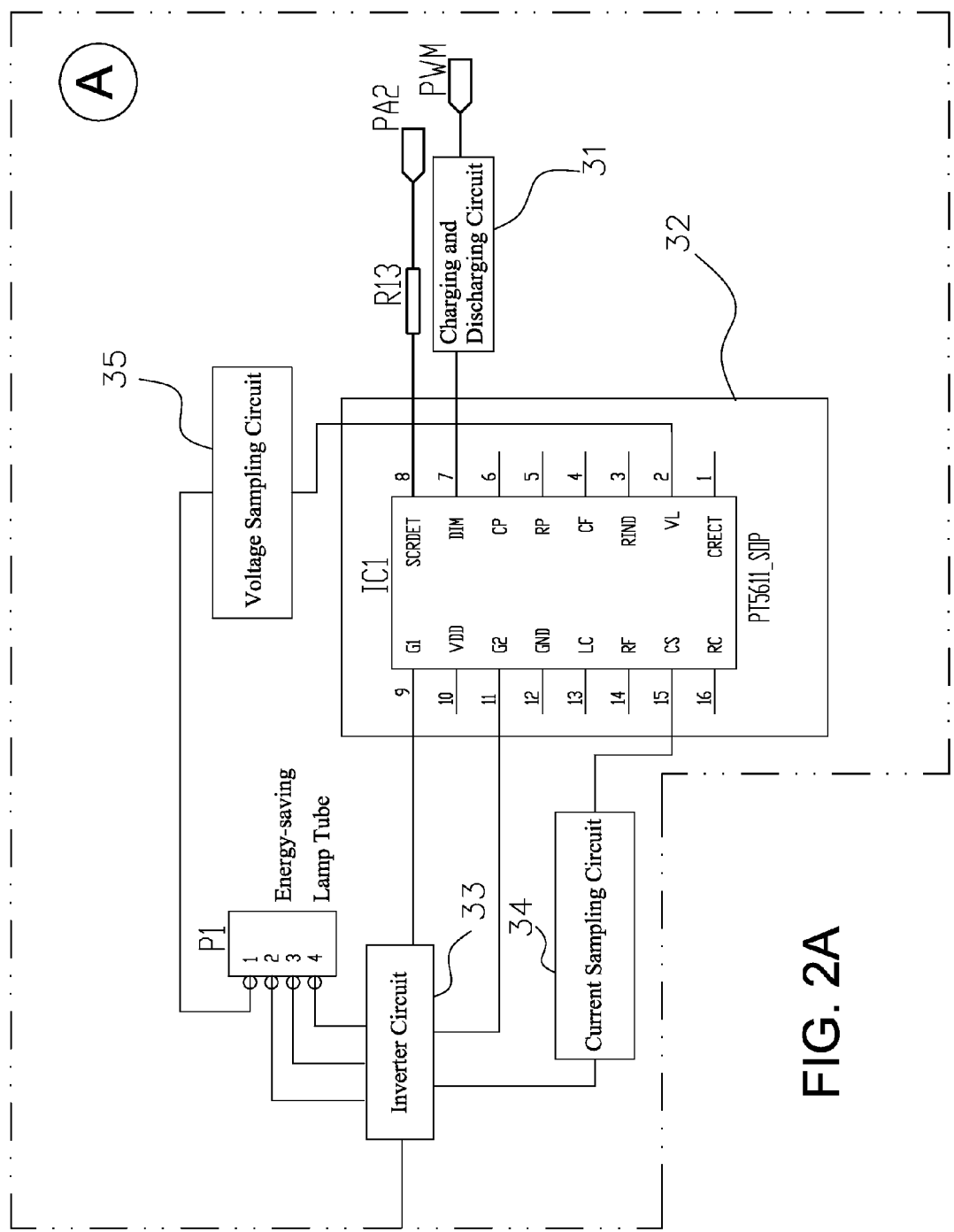
FIG. 2A is the part A of the FIG. 2.
Figure 2B:
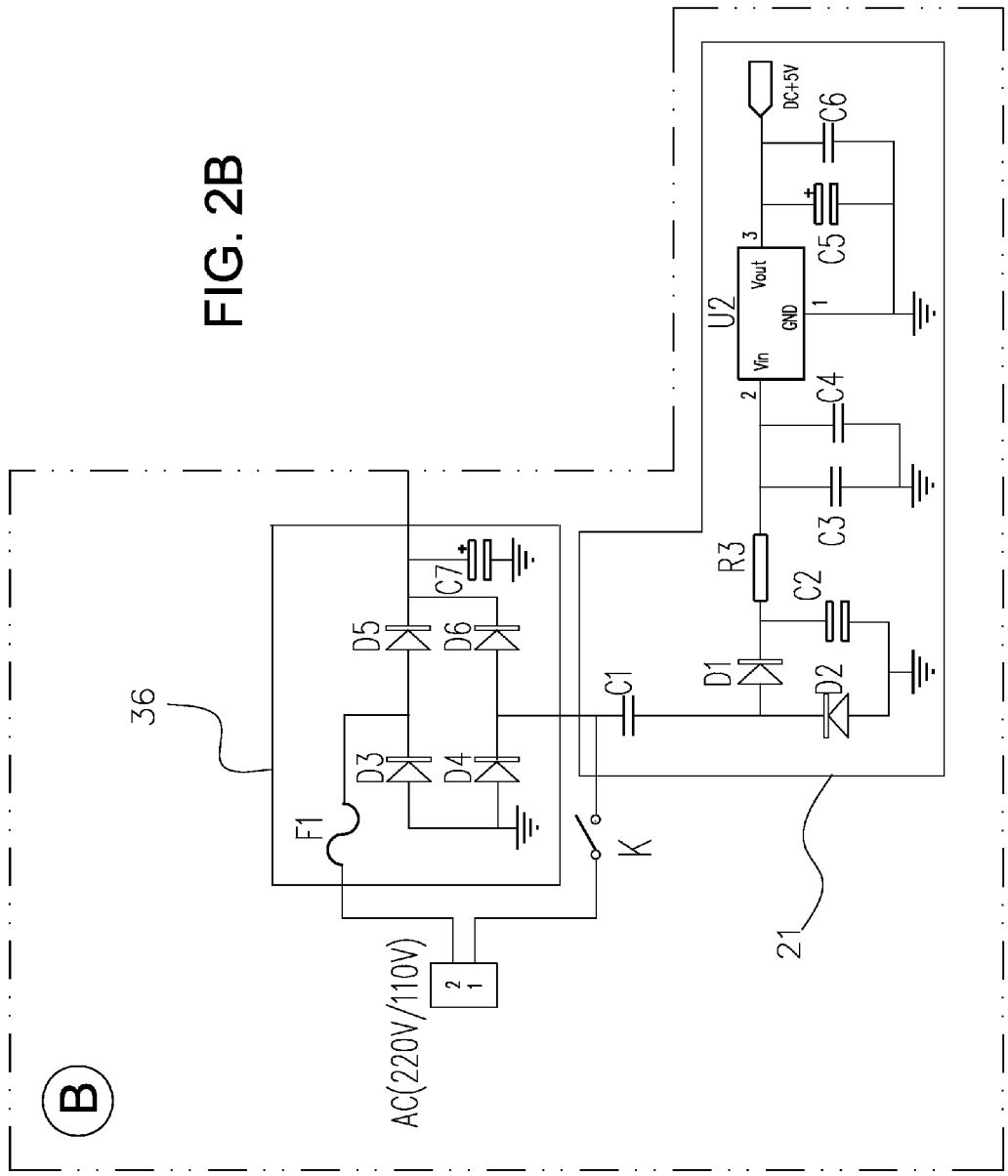
FIG. 2B is the part B of the FIG. 2.
Figure 2C:
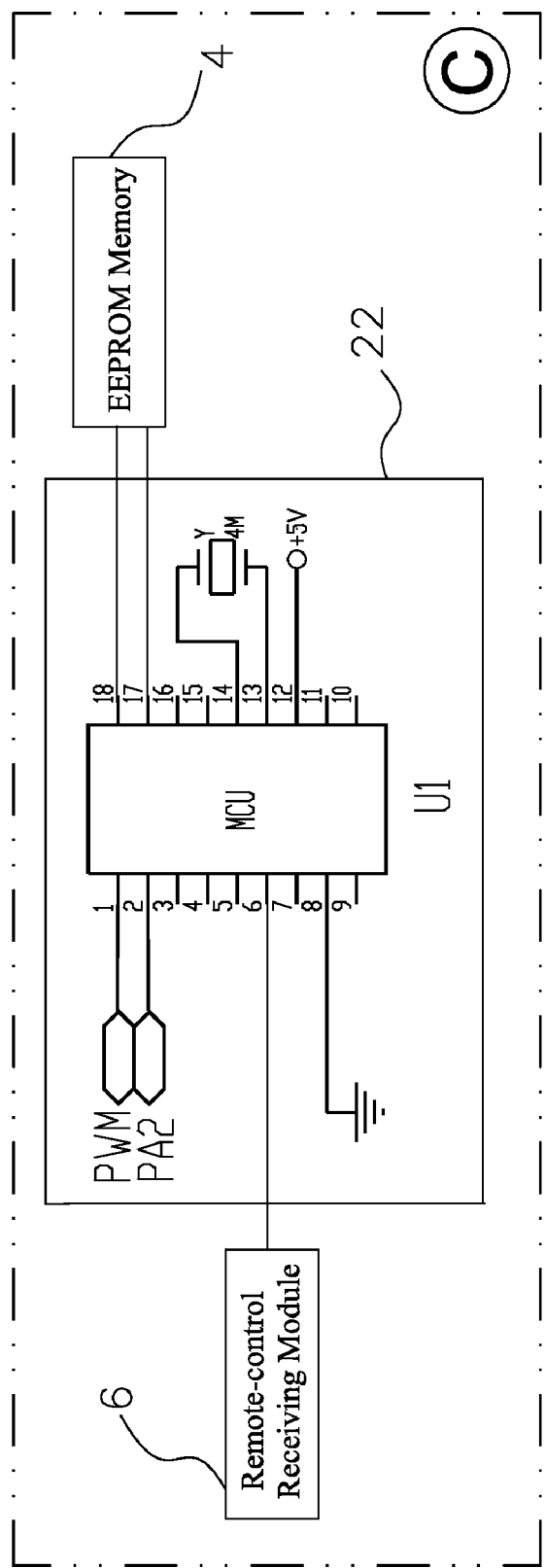
FIG. 2C is the part C of the FIG. 2.
Figure 3:
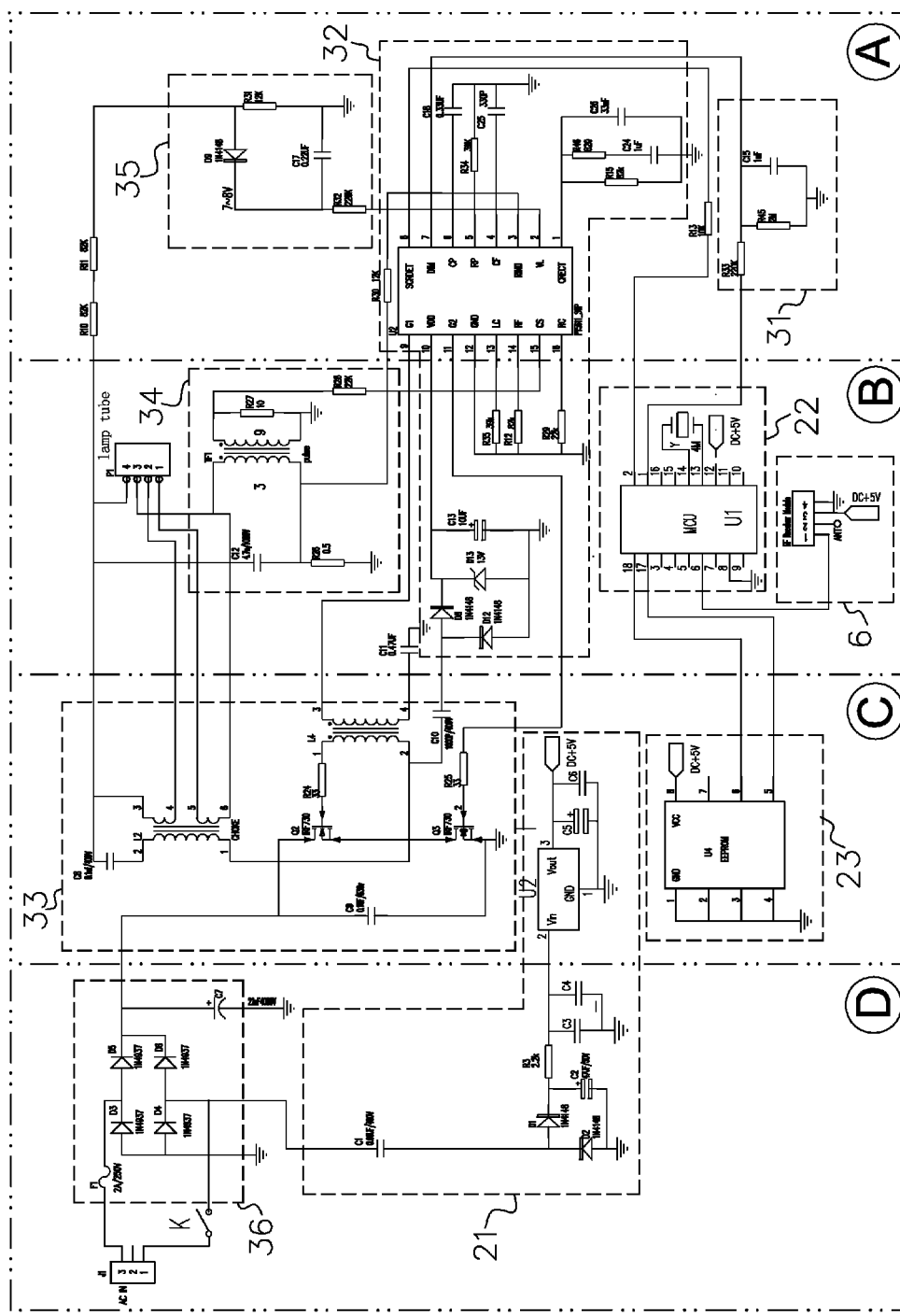
FIG. 3 is a complete circuit diagram for the embodiment of this invention, the FIG. 3 is separated as four parts of A, B, C and D.
Figure 3A:
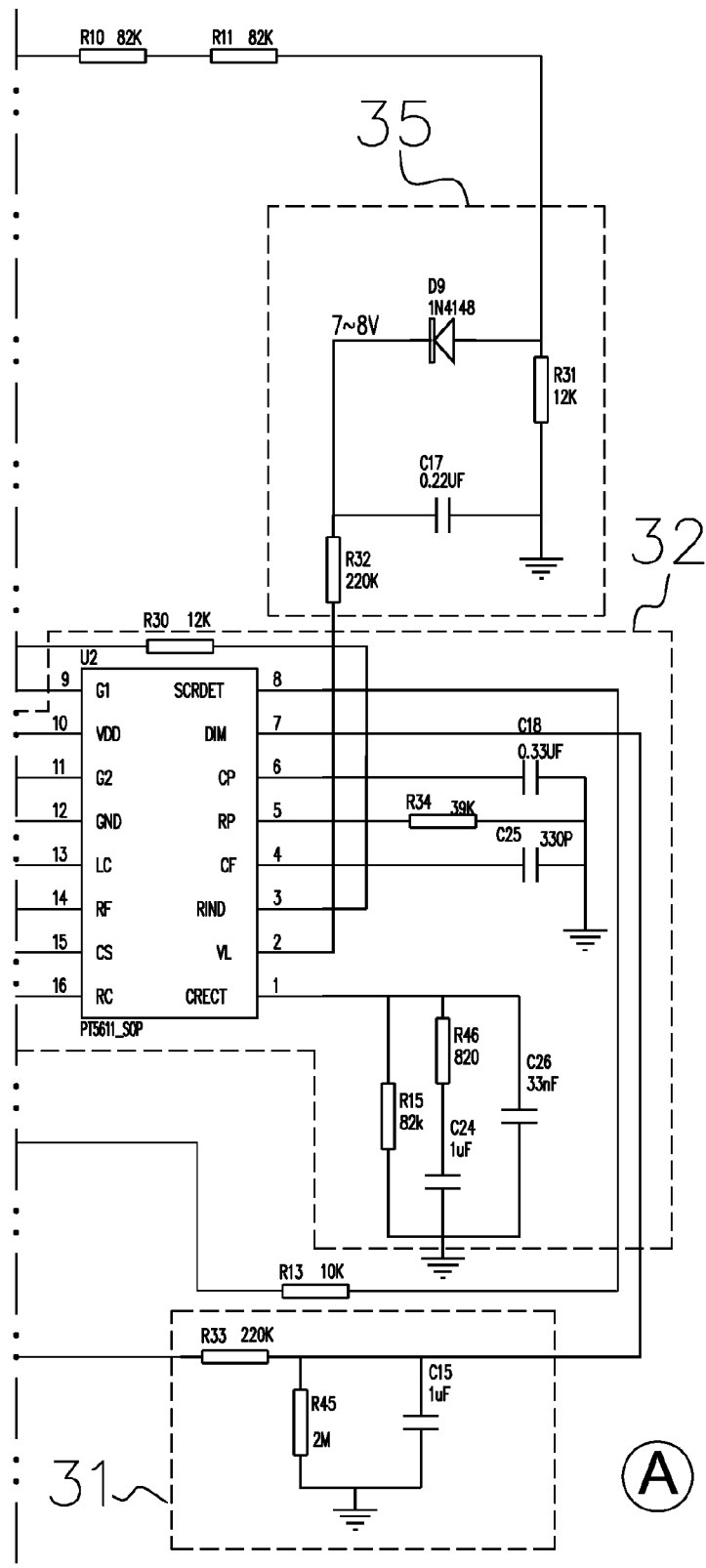
FIG. 3A is the part A of the FIG. 3.
Figure 3B:
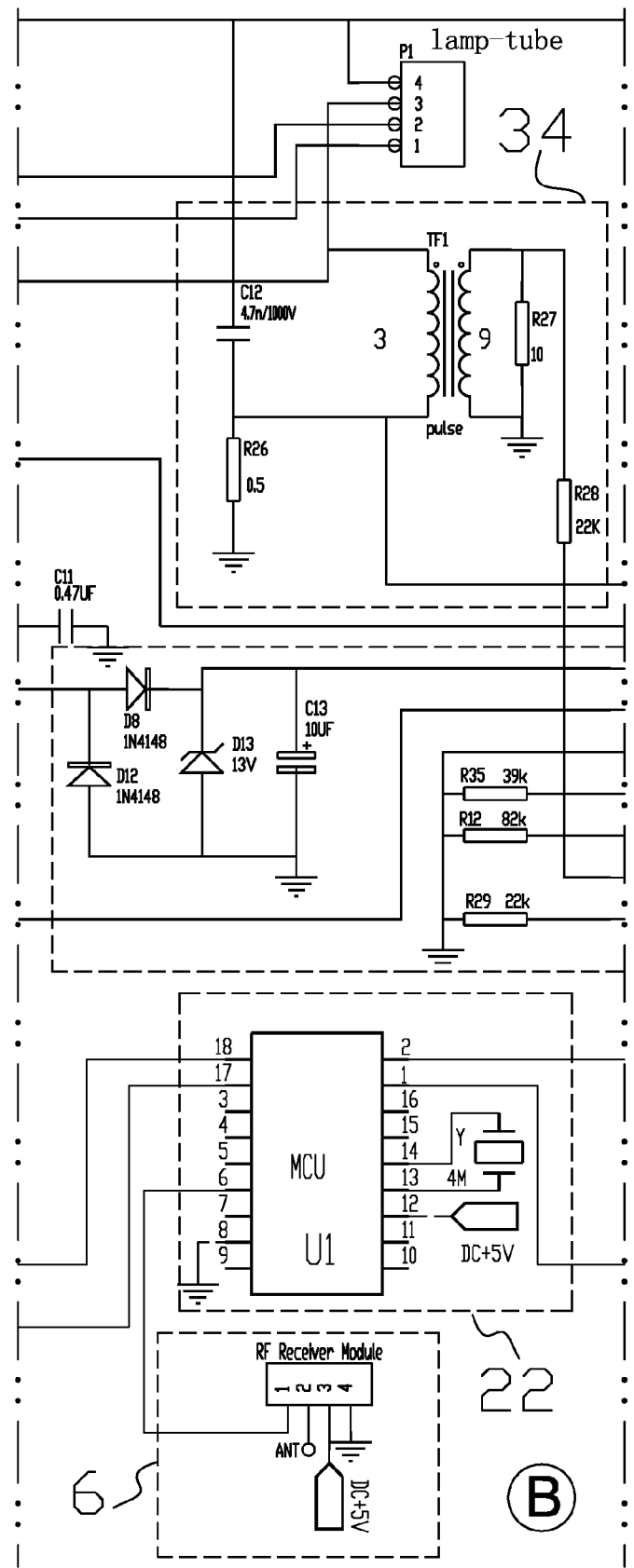
FIG. 3B is the part B of the FIG. 3.
Figure 3C:
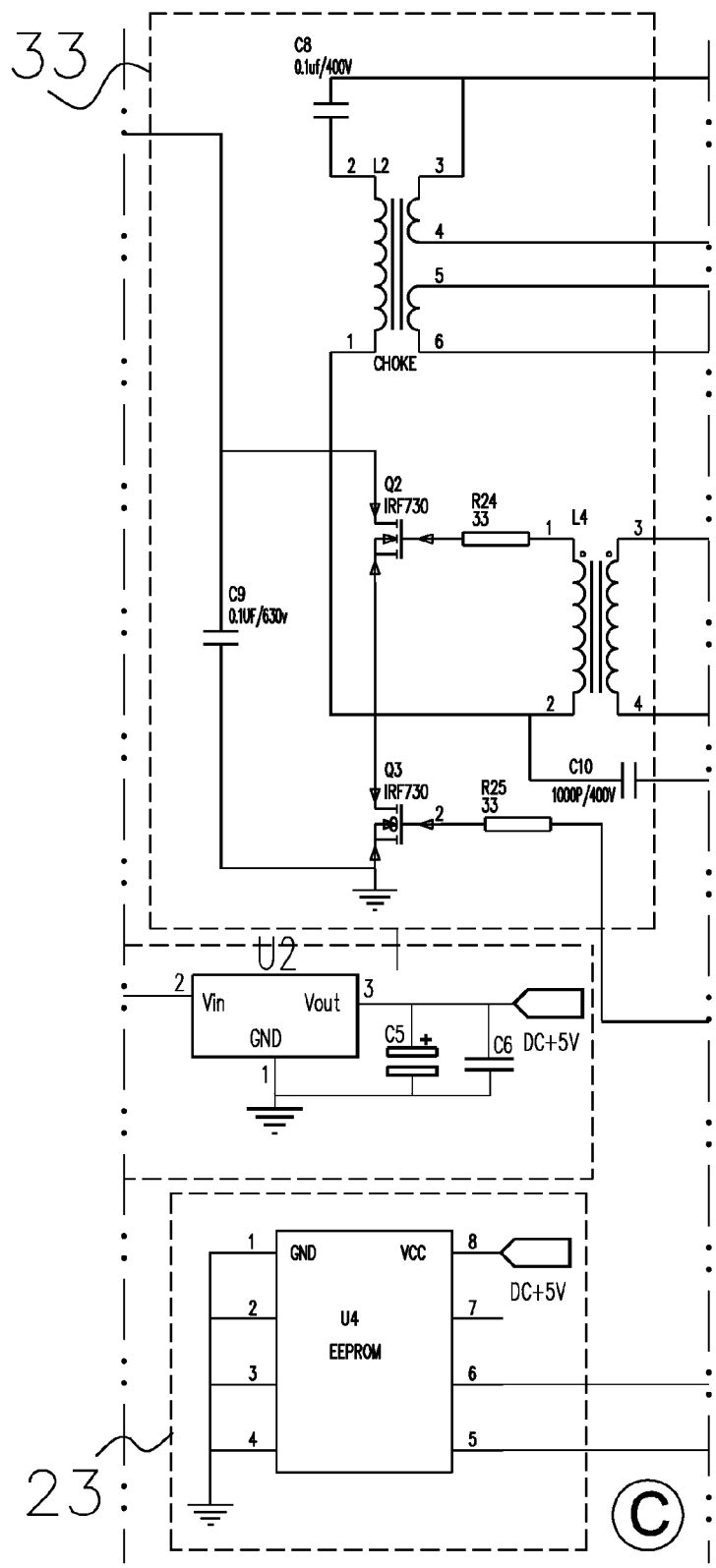
FIG. 3C is the part C of the FIG. 3.
Figure 3D:
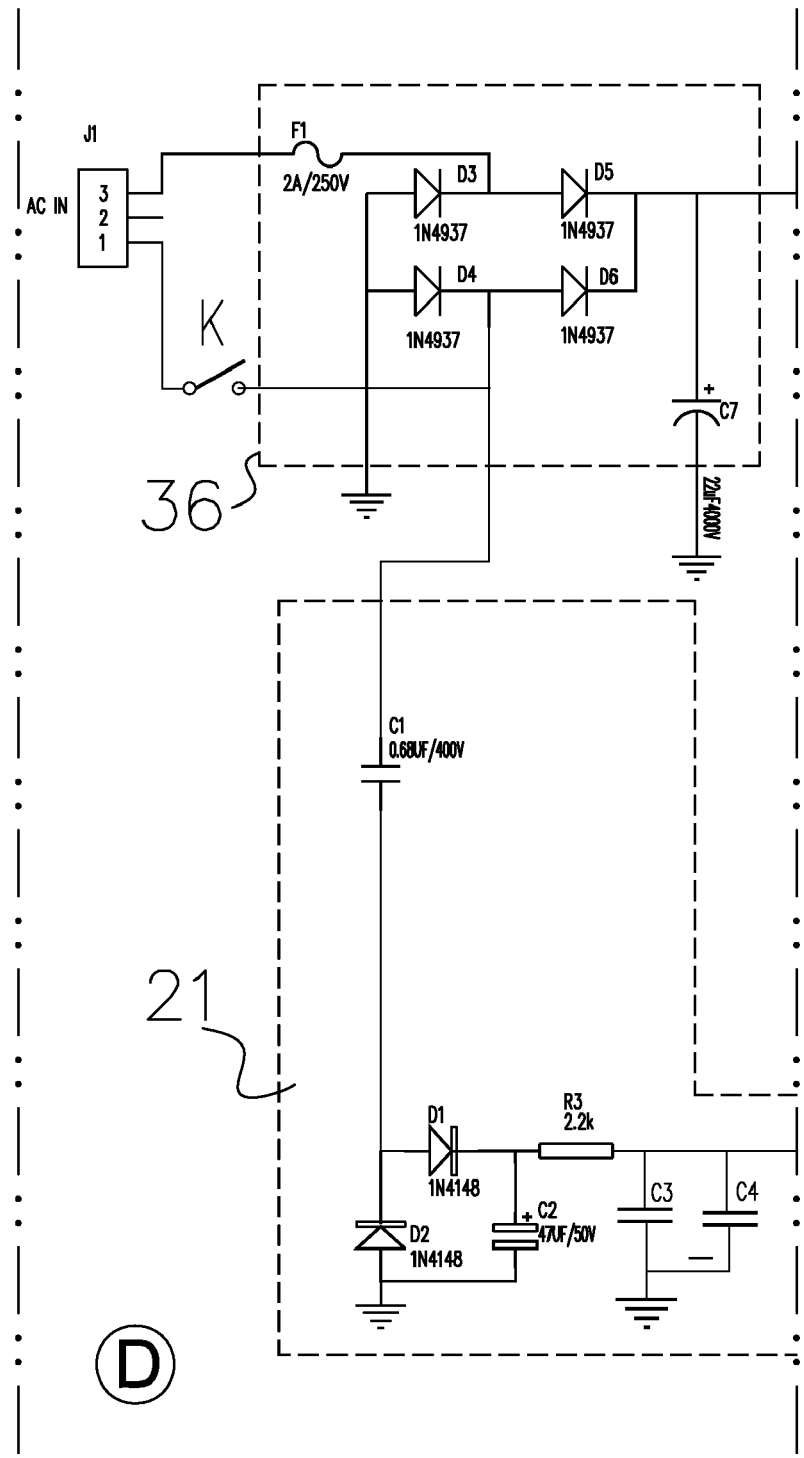
FIG. 3D is the part D of the FIG. 3.

As shown in FIG. 1, the dimmable energy-saving lamp with remote-control button operation feature comprises one energy-saving lamp tube, one button-dimming switch K, one power supply module, one SCM control module 2, one dimming control module 3, one EEPROM storage module 4, one remote-control transmitting module 5 and one remote-control receiving module 6.

The $1^{st}$ terminal of the button-dimming switch K is connected to municipal power, the $2^{nd}$ terminal of the button-dimming switch K is connected to the $1^{st}$ capacitor C1 of the power supply circuit, the on and off motions of the button-dimming switch will turn on and off the power supply, thus the SCM will be reset, the on/off status (power on and off) and time will result in different reset modes, the SCM program determines the on/off motions by detecting the reset mode, the SCM control module 2 outputs PMW signals of different widths through the application according to the on/off conditions and time of power signals from the power supply module, and the signal output end of said SCM control module 2 is connected to the signal input end of said dimming control module 3, while the dimming control module 3 outputs different working voltages according to the received PMW signals of different widths, the signal output end of said dimming circuit 3 is connected to the signal input end of the energy-saving lamp tube.

Furthermore, one remote-control transmitting module 5 encodes remote-controlled dimming signals or on/off signals before transmitting them as wireless RF carrier wave signals, while corresponding remote-control receiving module 6 will receive the RF carrier wave signals and decode them before sending them to the SCM control module 2, which will then output PWM signals or on/off signals to the dimming control module 3 so as to real remote-controlled dimming and on/off functions.

The whole circuit further comprises the EEPROM storage module 4, which is connected to the input and output ends of said SCM control module 2 as the luminance memory module, said SCM control module 2 will then store the adjusted luminance in the EEPROM, when startup, the SCM in the SCM control module 2 will invoke the stored value in the EEPROM to lighten the lamp via the circuit. Thus, the SCM outputs PWM signals of different widths or high/low level signals according to the value in the EEPROM, or the value sent by the remote-control receiving module or the SCM reset signals caused by the on/off of buttons, the signal output end of said SCM control module 2 is connected to the signal input end of said dimming control module 3.

In this embodiment, the SCM control module 2 comprises a core circuit 22 made up of the SCM microprocessor U1 of model HT48R06 and its peripheral components, Pin 1 and Pin 2 of said SCM microprocessor U1 are connected to the signal input end of said dimming control module 3 as the signal output ends of said SCM control module 2.

The power supply module 1 comprises the power circuit 21, which comprises the $1^{st}$ capacitor C1, the $2^{nd}$ capacitor C2, the $3^{rd}$ capacitor C3, the $4^{th}$ capacitor C4, the $5^{th}$ capacitor C5, the $6^{th}$ capacitor C6, the $3^{rd}$ resistor R3, the $1^{st}$ diode D1 and the $2^{nd}$ diode D2 and the 3-terminal stabilizing tube U2, wherein, the $1^{st}$ terminal of the $1^{st}$ capacitor C1 is connected to the $2^{nd}$ terminal of said button-dimming switch K, the $2^{nd}$ terminal of the $1^{st}$ capacitor C1 is connected to the positive pole of the $1^{st}$ diode D1, the $2^{nd}$ terminal of the $1^{st}$ capacitor C1 is connected to the negative pole of the $2^{nd}$ diode D2, both terminals of the $2^{nd}$ capacitor C2 are respectively connected to the negative pole of the $1^{st}$ diode D1 and the positive pole of the $2^{nd}$ diode D2, the positive pole of the $2^{nd}$ diode D2 is grounded, the negative pole of the $1^{st}$ diode D1 is connected to the $1^{st}$ terminal of the $3^{rd}$ resistor R3, the $2^{nd}$ terminal of the $3^{rd}$ resistor R3 is connected to the input end of the 3-terminal stabilizing tube U2, the output end of said 3-terminal stabilizing tube U2 is connected to Pin 12 of the SCM microprocessor U1 to supply power to the SCM microprocessor U1; the ground terminal of the 3-terminal stabilizing tube U2 is grounded; the $1^{st}$ terminals of the $3^{rd}$ capacitor C3 and the $4^{th}$ capacitor C4 are both connected to the $2^{nd}$ terminal of the $3^{rd}$ resistor R3, the $2^{nd}$ terminals of the $3^{rd}$ capacitor C3 and the $4^{th}$ capacitor C4 are both grounded; the $1^{st}$ terminals of the $5^{th}$ capacitor C5 and the $6^{th}$ capacitor C6 are both connected to output end of the 3-terminal stabilizing tube U2, the $2^{nd}$ terminals of the $5^{th}$ capacitor C5 and the $6^{th}$ capacitor C6 are both grounded. This circuit supplies stable 5V DC working power to the SCM microprocessor U1.

The dimming control module 3 comprises one charging and discharging circuit 31, one main control circuit 32, one inverter circuit 33, one current sampling circuit 34, one voltage sampling circuit 35 and one power supply switch circuit 36, said current sampling circuit 34 and voltage sampling circuit 35 form the closed-loop negative feedback circuit, after the PWM signals of the signal output end of said SCM control module 2 passes the charging and discharging circuit 31, the PWM signals with different widths generated by the SCM control module 2 are converted into continuous voltage signals, which are then inputted into the $1^{st}$ signal input pin of the main control circuit 32, the main control circuit 32 will then carry out voltage-control oscillation processing on voltage signals inputted from the $1^{st}$ signal input pin and then output square-wave signals of different frequencies at the $1^{st}$ signal output end and the $2^{nd}$ signal output end of said main control circuit; PA2 signals of the signal output end of said SCM control module 2 are inputted into the $2^{nd}$ signal input pin of said main control circuit 32 via resistor R13, then the main control circuit 32 will generate on/off signals according to different PA2 signals so as to achieve the remote on/off feature of the energy-saving lamp; and the inverter circuit 33 outputs different working voltages to the energy-saving lamp tube as driven by the square wave signals of different frequencies outputted by the main control circuit 32; the signal input end of said current sampling circuit 34 is connected to the $1^{st}$ output end of said inverter circuit 33, the signal input end of said voltage sampling circuit 35 is connected to the $2^{nd}$ output end of said inverter circuit 33, the signal output end of said current sampling circuit 34 is connected to the $3^{rd}$ signal input end of said main control circuit 32, the signal output end of said voltage sampling circuit 35 is connected to the $4^{th}$ signal input end of said main control circuit 32.

Wherein, the power supply switch circuit 36 introduces the municipal power from the jack J1, then the power passes the fuse F1, the $3^{rd}$ diode D3, the $4^{th}$ diode D4, the $5^{th}$ diode D5 and the $6^{th}$ diode D6, which form the regulating circuit, the filter of the $7^{th}$ capacitor C7 will convert the 220V AC power into hi-voltage DC power, which is then sent into the inverter circuit 33.

The main control chip IC1 of the main control circuit 32 adopts PT5611_SOP chip, as the $1^{st}$ signal input end of the main control chip IC1, Pin 7 is connected to the pulse modulation signal output end (i.e., Pin 1 of said SCM control chip U1) of the SCM microprocessor U1 via the charging and discharging circuit 31; as the $2^{nd}$ signal input end of the main control chip IC1, Pin 8 is connected to the switch control signal output end (i.e., Pin 2 of said SCM control chip U1) of the SCM microprocessor U1 via the resistor R13, in this embodiment, the switch control signal output end (i.e., Pin 2 of said SCM control chip U1) of the SCM microprocessor U1 is connected to Pin 8 of said main control chip IC1 after being connected to the partial pressure resistor R13; as the $4^{th}$ signal input end of the main control chip IC1, Pin 2 is connected to the signal output end of the voltage sampling circuit 35; as the $3^{rd}$ signal input end of the main control chip IC1, Pin 15 is connected to the signal output end of the current sampling circuit 34; as the $1^{st}$ and $2^{nd}$ signal output ends, Pin 9 and Pin 11 of the main control chip IC1 are respectively connected to the signal input end of the inverter circuit 33. The charging and discharging circuit 31, the inverter circuit 33, the current sampling circuit 34 and the voltage sampling circuit 35 adopt the same circuit structure as that of the charging and discharging circuit, the main control circuit, the inverter circuit, the current sampling circuit and the voltage sampling circuit disclosed in the previous utility model application submitted by the applicant under the Patent No. ZL 200820086672.9 (A Remote-Control Dimmable Energy-saving Lamp).

The elements for button dimming are as follows:

When the button-dimming switch K is closed, the SCM microprocessor U1 is powered and will be reset, the program in the SCM microprocessor U1 will detect whether the value of the power-on and reset unit equals the EF value, if the off-time of the button switch exceeds 5 seconds, the remaining voltage in the circuit will be consumed down to about 0V due to the long off-time, thus the values in the SCM storage unit will not be stored, and so the value of the reset unit will not equal EF, in this case, the SCM will directly invoke the luminance value in the EEPROM storage module to output the PWM signals, then the energy-saving lamp will be on at the luminance when the lamp is turned off for the last time, which realizes luminance memory; if the off-time of the button switch is less than 5 seconds before the switch is connected again, the remaining voltage in the circuit will not be less than 3V, which is enough for keeping the values in the SCM storage unit, therefore, the value of the reset unit will be equal EF; if the user needs to adjust the luminance after startup, just disconnect button-dimming switch and connect it again; when the value of the reset unit equals the EF value, the SCM program will further detect whether the value in the luminance storage unit (which stores the current luminance value during auto dimming, the values at other time will be zeroed) equals 0, when the luminance value equals 0, the SCM program will start auto dimming from 5% to 100% of the luminance, the whole process will be about 10 seconds, when the highest luminance is reached, it will automatically adjust it down to 5% in about 10 seconds, after 3 cycles, the SCM program will store the luminance values in the luminance storage unit during the auto dimming process, if the button-dimming switch is not connected, the luminance will stay at 100%; at any time during the auto dimming, the user may disconnect the switch if satisfied with the current luminance and then immediately connect it again (the off-time should be less than 5 seconds), the program will determine the value of the luminance storage unit again, at this time, the value is not 0, then the SCM program will turn on the energy-saving lamp at the value stored in the luminance storage unit and send this value to the EEPROM storage module and at the same time zero the value of the luminance storage unit, and then the button dimming process of the SCM is completed;

The luminance percentage of 5%-100% corresponds to a PWM signal, the SCM will output different PWM signals according to different luminance, and the dimming control module 3 will also output a stable working voltage to the energy-saving lamp tube according to the PWM signal, thus the different luminance of the energy-saving lamp tube between 5%-100% can be obtained.

The elements for remote dimming are as follows:

When the button-dimming switch is connected, if the remote-control transmitting module is continuously transmitting dimming signals, the remote-control receiving module, upon receipt of the signals, with decode the signals, if the signal encoding is in accordance with the preset encoding of the receiver, the SCM program will slowly increase or decrease the current luminance value between 5%~100%, the time for increasing from 5% to 100% is about 20 seconds, when 100% is reached, the luminance will be decreased gradually to 5%, also in about 20 seconds, as long as the remote-control transmitting module keeps transmitting, the luminance will be changed in cycles, and the SCM will synchronously output corresponding PWM signals to the main control circuit according to different luminance values to realize remote stepless dimming, once the remote-control transmitting module stops transmitting dimming signals, the SCM program will also stop increasing or decreasing the luminance, and the luminance will stay at the value on the last remote control operation, this luminance value will be sent to the EEPROM storage 4.

Figure 4:
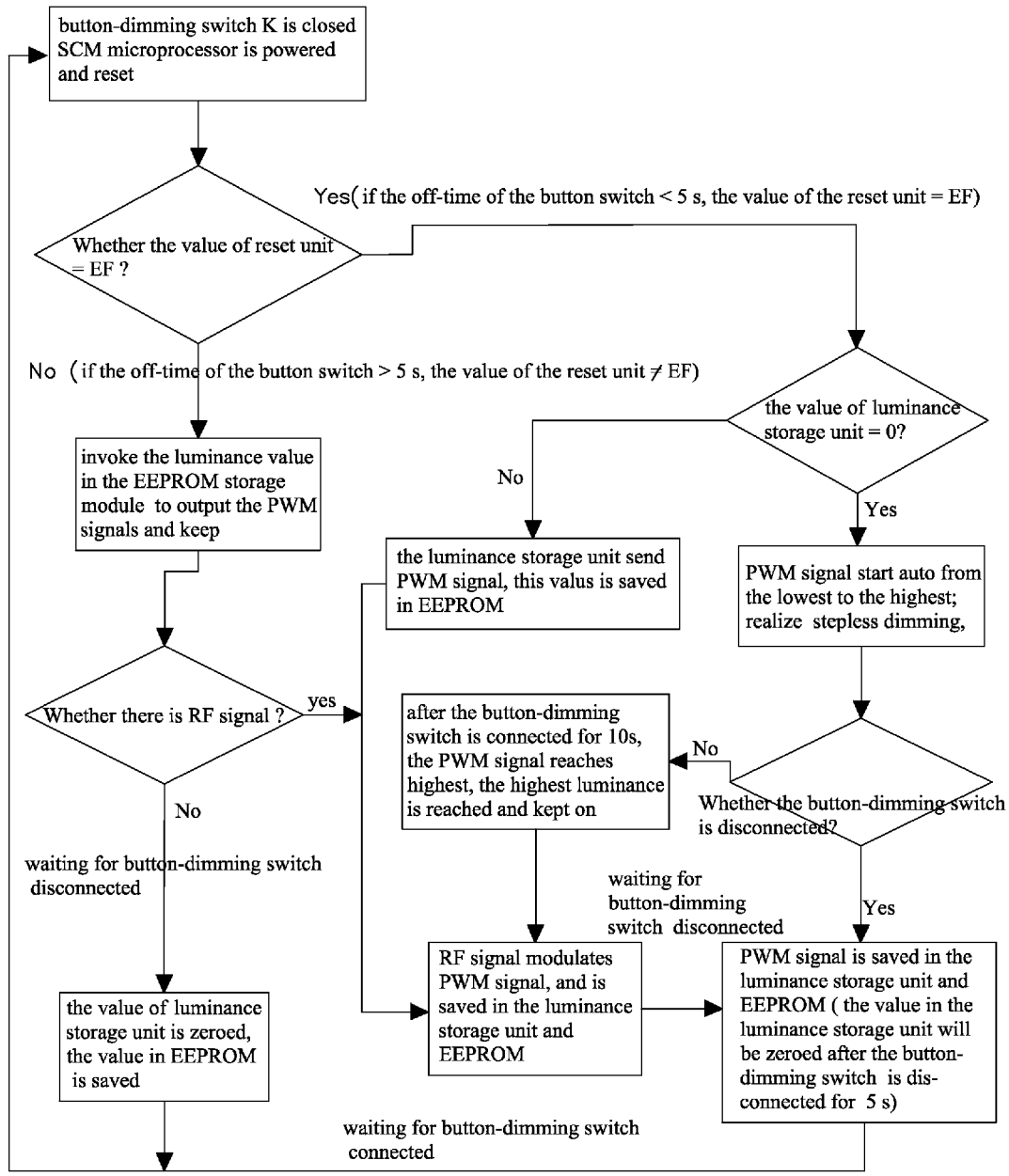
FIG. 4 is a flow chart for the dimming procedure of the SCM microprocessor in the embodiment of this invention.

Please see FIG. 4 for the dimming control flow of the SCM microprocessor.

The process of remote on/off is as follows:

When the button-dimming switch is connected and the energy-saving lamp goes out, if the remote-control transmitting module has transmitted the "on" signal, the remote-control receiving module, upon receipt of the signal, will decode the signal, if the signal decoding is in accordance with the preset encoding of the receiver, Pin 2 of the SCM U1 will output high level to Pin 8 of the main control circuit, and then the main control circuit will output the "on" signal to turn on the energy-saving lamp; in the meanwhile, the SCM program will invoke the luminance value stored in the EEPROM storage 4 to output the PWM signal to the main control circuit so that the energy-saving lamp can be turned on at the luminance when the lamp is turned off for the last time; if the remote-control transmitting module has transmitted the "off" signal, Pin 2 of the SCM U1 will output low level, and then the main control circuit will output "off" signal to turn off the energy-saving lamp, in the meanwhile, the SCM will store the luminance value at the time the lamp is turned off in the EEPROM storage 4.

What is claimed is:

1. An energy-saving lamp with remote control and button dimming feature comprising:

A power supply module (1), a SCM control module (2), a dimming control module (3), a energy-saving lamp tube, a remote-control transmitting module (5) and remote-control receiving module (6);

one end of the power supply module (1) being connected with an external power supply through a button-dimming switch (K), another end thereof being connected to different parts of a whole circuit including the SCM control module (2), wherein said power supply module (1) supplies power to the energy-saving lamp tube and the whole circuit;

an output end of the SCM control module (2) being connected to the dimming control module (3), said SCM control module (2) may output PMW signals with different widths through applications according to on/off conditions and time durations of power signals from the power supply module (1), and a signal output end of said SCM control module (2) being connected to a signal input end of said dimming control module (3);

wherein the dimming control module (3) can output different working voltages according to the received PMW signals with different widths, a signal output end of said dimming control module (3) being connected to a signal input end of the energy-saving lamp tube;

the energy-saving lamp tube being an illuminating component;

the remote-control transmitting module (5) for transmitting wireless signals at least including dimming signals; and the remote-control receiving module (6) for receiving the wireless signals of dimming, an output end thereof being connected to one input end of said SCM control module (2).

2. The energy-saving lamp with remote control and button dimming feature according to claim 1, wherein said whole circuit further comprises:

a EEPROM memory module (4) comprising of an EEPROM chip being connected to the input and output ends of said SCM control module (2) as a luminance memory module, said SCM control module (2) will then store an adjusted luminance in the EEPROM, when startup the SCM in the SCM control module (2) will invoke the stored value in the EEPROM to lighten the lamp via the circuit.

3. The energy-saving lamp with remote control and button dimming feature according to claim 1, wherein said SCM control module (2) comprises:

a SCM microprocessor (U1) of model HT48R06, wherein, pin 6 of said SCM microprocessor (U1) as the signal input end of said SCM control module (2) is connected to a signal output end of said remote-control receiving module (6);

wherein Pin 17 and Pin 18 of said SCM microprocessor (U1) act as signal communication ends between said SCM control module (2) and said EEPROM storage module (4);

wherein Pin 1 and Pin 2 of said SCM microprocessor (U1) are connected to the signal input end of said dimming control module (3) as signal output ends of said SCM control module (2).

4. The energy-saving lamp with remote control and button dimming feature according to claim 1 wherein said SCM control module (2) further comprises:

One power circuit (21), the power circuit (21) comprising a $1^{st}$ capacitor (C1), $2^{nd}$ capacitor (C2), $3^{rd}$ capacitor (C3), $4^{th}$ capacitor (C4), $5^{th}$ capacitor (C5), $6^{th}$ capacitor (C6), $3^{rd}$ resistor (R3), $1^{st}$ diode (D1), $2^{nd}$ diode (D2) and 3-terminal stabilizing tube (U2);

wherein, the $1^{st}$ terminal of the $1^{st}$ capacitor (C1) is connected to the $2^{nd}$ terminal of said button-dimming switch (K), the $2^{nd}$ terminal of the $1^{st}$ capacitor (C1) is connected to a positive pole of the $1^{st}$ diode (D1), a $2^{nd}$ terminal of the $1^{st}$ capacitor (C1) is connected to a negative pole of the $2^{nd}$ diode (D2), both terminals of the $2^{nd}$ capacitor (C2) are respectively connected to a negative pole of the $1^{st}$ diode (D1) and the positive pole of the $2^{nd}$ diode (D2), the positive pole of the $2^{nd}$ diode (D2) is grounded, the negative pole of the $2^{nd}$ diode (D2) is connected to the $1^{st}$ terminal of the $3^{rd}$ resistor (R3), the $2^{nd}$ terminal of the $3^{rd}$ resistor (R3) is connected to a input end of the 3-terminal stabilizing tube (U2), a output end of said 3-terminal stabilizing tube (U2) is connected to a Pin 12 of the SCM microprocessor (U1) to supply power to the SCM microprocessor (U1); a ground terminal of the 3-terminal stabilizing tube (U2) is grounded; a $1^{st}$ terminals of the $3^{rd}$ capacitor (C3) and a $4^{th}$ capacitor (C4) are both connected to a $2^{nd}$ terminal of the $3^{rd}$ resistor (R3), a $2^{nd}$ terminals of the $3^{rd}$ capacitor (C3) and the $4^{th}$ capacitor (C4) are both grounded; a $1^{st}$ terminals of the $5^{th}$ capacitor (C5) and the $6^{th}$ capacitor (C6) are both connected to output end of the 3-terminal stabilizing tube (U2), a $2^{nd}$ terminals of the $5^{th}$ capacitor (C5) and the $6^{th}$ capacitor (C6) are both grounded.

5. The energy-saving lamp with remote control and button dimming feature according to claim 1, wherein said dimming control module (3) comprises:

a charging and discharging circuit (31) connected to the signal output end of said SCM control module (2) for converting PWM signals with different widths generated by the SCM control module (2) into continuous voltage signals;

a main control circuit (32), a $1^{st}$ signal input pin thereof being connected to an output end of the charging and discharging circuit (31), voltage signals inputted by the $1^{st}$ signal input pin are treated by voltage-control oscillation processing to output square-wave signals of different frequencies at a $1^{st}$ signal output end and $2^{nd}$ signal output end of said main control circuit (32); and an inverter circuit (33), which is connected to the $1^{st}$ signal output end and the $2^{nd}$ signal output end of said main control circuit (32) and outputs different working voltages to said energy-saving lamp tube according to the square-wave signals of different frequencies outputted by the main control circuit (32) so as to achieve dimming and current stabilization.

6. The energy-saving lamp with remote control and button dimming feature according to claim 5, wherein said dimming control module (3) further comprises:

a current sampling circuit (34) and a voltage sampling circuit (35) forming a closed-loop negative feedback circuit;

wherein, a signal input end of said current sampling circuit (34) is connected to a $1^{st}$ output end of said inverter circuit (33), a signal output end of said current sampling circuit (34) is connected to a $3^{rd}$ signal input end of said main control circuit (32);

wherein a signal input end of said voltage sampling circuit (35) is connected with a $2^{nd}$ output end of said inverter circuit (33), a signal output end of said voltage sampling circuit (35) is connected to a $4^{th}$ signal input end of said main control circuit (32).

* * * * *